United States Patent [19]
Okuda et al.

[11] Patent Number: 5,984,280
[45] Date of Patent: Nov. 16, 1999

[54] APPARATUS FOR FOAMING A VISCOUS MATERIAL

[75] Inventors: Shinji Okuda, Takarazuka; Yasuyuki Yoshimoto; Masaharu Takada, both of Ibaraki, all of Japan

[73] Assignees: Sunstar Engineering, Inc., Osaka, Japan; Uni-Sunstar B.V., Amsterdam, Netherlands

[21] Appl. No.: 09/153,330

[22] Filed: Sep. 15, 1998

Related U.S. Application Data

[62] Division of application No. 08/758,396, Nov. 29, 1996, Pat. No. 5,874,031.

[30] Foreign Application Priority Data

Dec. 1, 1995 [JP] Japan ................................ 7-314227

[51] Int. Cl.⁶ .................................................. B01F 3/04
[52] U.S. Cl. ........................ 261/28; 261/30; 261/DIG. 26
[58] Field of Search ............................. 261/28, 30, 87, 261/DIG. 26; 425/4 R

[56] References Cited

U.S. PATENT DOCUMENTS

| | | | |
|---|---|---|---|
| 4,059,714 | 11/1977 | Scholl et al. ............................... | 261/28 |
| 4,337,318 | 6/1982 | Doyle . | |
| 4,601,645 | 7/1986 | Schmitkons ................................ | 261/28 |
| 4,632,314 | 12/1986 | Smith et al. ...................... | 261/DIG. 26 |
| 4,778,631 | 10/1988 | Cobbs, Jr. et al. . | |
| 4,791,142 | 12/1988 | Pleuse et al. ..................... | 261/DIG. 26 |
| 4,915,881 | 4/1990 | Straw et al. ..................... | 261/DIG. 26 |
| 5,066,428 | 11/1991 | Manlowe et al. ................. | 261/DIG. 26 |

FOREIGN PATENT DOCUMENTS

| | | | |
|---|---|---|---|
| 0483856 A1 | 5/1992 | European Pat. Off. ........ | 261/DIG. 26 |
| 62-125831A | 6/1987 | Japan . | |
| 63-264327 | 11/1988 | Japan . | |
| 6198152A | 7/1994 | Japan . | |
| 9094450A | 4/1997 | Japan . | |

*Primary Examiner*—C. Scott Bushey
*Attorney, Agent, or Firm*—Birch, Stewart, Kolasch & Birch, LLP

[57] ABSTRACT

Low-pressure gas is mixed in a viscous material. The flow of the gas can be easily controlled so that the dispersion of the mixing ratio of the viscous material to the gas may be confined within a small tolerance and fine bubbles may be uniformly distributed in the interior of the viscous material. The gas is mixed in the viscous material by a first pump, from which a mixture of the gas and the viscous material is delivered. Pressure is applied to the mixture by a second pump. The gas is distributed in the interior of the viscous material by allowing the mixture under pressure to pass through a conduit assembly. The viscous material is foamed when the mixture is discharged from a nozzle through a discharge pipe.

6 Claims, 10 Drawing Sheets

APPARATUS FOR FOAMING A VISCOUS MATERIAL

This application is a divisional of application Ser. No. 08/758,396, filed on Nov. 29, 1996, now U.S. Pat. No. 5,874,031, the entire contents of which are hereby incorporated by reference.

BACKGROUND OF THE INVENTION

This application claims the priority of Japanese Patent Application No. 7-314227/1995 filed on Dec. 1, 1995, which is incorporated herein by reference.

1. Field of the Invention

This invention relates to a method of and an apparatus for foaming a viscous material which is particularly adapted for use as, e.g., a gasket to be formed at a job site or a fissure-filling sealant.

2. Description of the Background Art

FIG. 10 shows a schematic view of a circuit that constitutes a prior art apparatus 90 of the kind indicated above.

In the apparatus illustrated in FIG. 10, a sump 91 containing a viscous material is provided, and a pipe leads therefrom to a power mixer 94 by way of a primary pump 92. A gas bomb 93 is filled with compressed gas, which is fed to the power mixer 94 after pressure adjustment.

The power mixer 94 is connected to a suitable drive motor M. When the drive motor M is energized, the viscous material and the compressed gas are stirred under pressure. The mixture, which is fed through a tubular conduit 95, emerges from a nozzle 96. Nitrogen, carbon dioxide and air may be suitable for use as the compressed gas. The apparatus 90 is used for, e.g., applying a coat of viscous polymer such as hot melt adhesive (as disclosed in Japanese Laid Open Patent Application No. 63-264327).

The hot melt adhesive comprises a thermoplastic polymer, which is solid at ordinary temperatures. Although the hot melt adhesive is molten into a fluid state when it is heated, it resumes the solid state when it is cooled to room temperature. Consequently, the hot melt adhesive provides good adhesion of one component to another. The prior art apparatus takes advantage of the property of the hot melt adhesive which provides good adhesion immediately after cooling down before the gas mixed therein is dispersed.

In the apparatus 90, the viscous material and the compressed gas have to be heated and subjected to pressure feed to the power mixer 94. When the viscous material has a viscosity of 100,000 cps, the power mixer 94 is assumed to have an internal pressure of 100 $Kg/cm^2$ or more. The compressed gas has to be put under higher pressure than the viscous material if the compressed gas is to be fed to the power mixer 94 simultaneously with the viscous material.

When the gas pressure is high, it is difficult to control the flow of the gas. A small error in the flow of the gas at the time of high pressure shows itself as a large error at the time of atmospheric pressure. For example, an error at the time of atmospheric pressure is 50 times as large as the error at the time of 50 $Kg/cm^2$. A large dispersion of the mixing ratio of the viscous material to the compressed gas is caused thereby. The gas phase which is distributed as bubbles in the interior of the viscous material is rendered uneven.

In view of the above-described problems, one of the primary objects of the invention is to provide a method of and an apparatus for foaming a viscous material in which gas at low pressures can be mixed with the viscous material and the flow of the gas can be easily controlled so that the dispersion of the mixing ratio of the viscous material to the gas may be confined within a small tolerance and the bubbles may be uniformly distributed in the interior of the viscous material.

SUMMARY OF THE INVENTION

In a preferred embodiment of the invention, gas at a pressure which is substantially as low as atmospheric pressure can be mixed with the viscous material without recourse to a power mixer.

A method according to the invention comprises the steps of mixing gas in a viscous material, applying pressure to a mixture of the gas and the viscous material by means of a pump, distributing the gas in the interior of the viscous material by allowing the mixture under pressure to pass through a tubular conduit, and foaming the viscous material by discharging the mixture.

A second embodiment of the method according to the invention comprises the steps of delivering a mixture of gas and a viscous material after mixing the gas in the viscous material by means of a first pump, applying pressure to the mixture by means of a second pump, distributing the gas in the interior of the viscous material by allowing the mixture under pressure to pass through a tubular conduit, and foaming the viscous material by discharging the mixture through a discharge pipe.

A further embodiment of the second embodiment of the method according to the invention refers to a mechanical suction pump to be used as the first pump of the second embodiment.

A further embodiment of the second embodiment of the method according to the invention refers to carbon dioxide to be used as the gas of the second method embodiment.

A further embodiment of the second embodiment of the method according to the invention refers to carbon dioxide and nitrogen to be used concomitantly with each other as the gas of the second method embodiment.

In accordance with another embodiment of the second embodiment of the method according to the invention, the mixing ratio of the viscous material to the gas is controlled by controlling the flow rate of the gas and the suction capacity of the first pump in sucking the viscous material during the first step, the flow rate and the suction capacity being controlled according to the pressure undergone by, and the density of, the viscous material in the discharge pipe.

A further embodiment of the second embodiment of the method according to the invention refers to a piston pump to be used as the second pump.

In accordance with another embodiment of the second embodiment of the method according to the invention, the mixture provided in the first step in is delivered to the second step at a delivery pressure of 100 $Kg/cm^2$ or less. In the second step, the mixture is put under pressure amounting to 100 $Kg/cm^2$ or more.

In accordance with another embodiment of the second embodiment of the method according to the invention, the mixture is allowed to pass through a static mixer in the second, third or fourth step.

In accordance with another embodiment of the second embodiment of the method according to the invention, the mixture is allowed to pass through a power mixer in the second, third or fourth step.

In accordance with another embodiment of the second embodiment of the method according to the invention, a pressure regulating valve provided downstream of the tubular conduit serves to maintain the pressure applied to the mixture in the tubular conduit at a predetermined level.

In accordance with another embodiment of the second embodiment of the method according to the invention, the second pump is actuated in association with a valve installed in a line for directing the mixture therethrough during the fourth step, the second pump being actuated earlier than the opening of the valve.

A third embodiment of the method according to the invention comprises the steps of mixing gas in a viscous material in the interior of at least one piston pump installed in the delivery pipe of a first pump allotted for delivering the viscous material, applying pressure to a mixture of the gas and the viscous material by means of a second pump, distributing the gas in the interior of the viscous material by allowing the mixture under pressure to pass through a tubular conduit, and foaming the viscous material by discharging the mixture from the tubular conduit.

A further embodiment of the third embodiment of the method according to the invention refers to a follower plate pump to be used as first pump.

In accordance with another embodiment of the third embodiment of the method according to the invention, the gas is the first to be supplied to the at least one piston pump during the first step, followed by a supply of the viscous material.

In accordance with another embodiment of the third embodiment of the method according to the invention, the gas to be mixed in the viscous material is supplied to the at least one piston pump separately from the viscous material.

In accordance with another embodiment of the third embodiment of the method according to the invention, a plurality of piston pumps are allotted for mixing the gas in the viscous material.

In accordance with another embodiment of the third embodiment of the method according to the invention, the mixing ratio of the viscous material to the gas is controlled by controlling the ratio of supply pressure applied to the viscous material to supply pressure applied to the gas in supplying them to the at least one piston pump during the first step.

In accordance with another embodiment of the third embodiment of the method according to the invention, the mixing ratio of the viscous material to the gas is controlled by controlling the flow rates of the gas and the viscous material to be supplied to the at least one piston pump during the first step, the flow rates being controlled according to the pressure undergone by, and the density of, the viscous material in the discharge pipe.

A further embodiment of the third embodiment of the method according to the invention refers to carbon dioxide to be used as the gas in the third embodiment.

A further embodiment of the third embodiment of the method according to the invention refers to carbon dioxide and nitrogen to be used concomitantly with each other as the gas in the third embodiment.

A further embodiment of the third embodiment of the method according to the invention refers to a piston pump to be used as said second pump.

In accordance with another embodiment of the third embodiment of the method according to the invention, the mixture is allowed to pass through a static mixer in the second, third or fourth step.

In accordance with another embodiment of the third embodiment of the method according to the invention, the mixture is allowed to pass through a power mixer in the second, third or fourth step.

In accordance with another embodiment of the third embodiment of the method according to the invention, a pressure regulating valve provided downstream of the tubular conduit serves to maintain the pressure applied to the mixture in the tubular conduit at a predetermined level.

In accordance with another embodiment of the third embodiment of the method according to the invention, the second pump is actuated in association with a valve installed in a line for directing the mixture therethrough during the fourth step, the second pump being actuated earlier than the opening of the valve.

A first embodiment of the apparatus according to the invention comprises a first pump for delivering a mixture of gas and a viscous material after mixing the gas in the viscous material, a second pump for applying pressure to the mixture when it has been delivered from the first pump, a tubular conduit through which the mixture under pressure is allowed to pass so that the gas may be distributed in the interior of the viscous material, and a discharge device for discharging the mixture when it has passed through the tubular conduit.

A first embodiment of the apparatus according to the invention further includes refers to a pressure regulating valve for regulating the pressure applied to the mixture in the tubular conduit.

The first embodiment of the apparatus further includes a valve provided downstream of the tubular conduit and a pressure control unit for maintaining the pressure applied to the mixture in the tubular conduit, the control action of the pressure control unit being such that the valve is closed when the second pump stops applying pressure to the mixture and that the second pump is actuated earlier than the opening of the valve.

The first embodiment of the apparatus further includes a flow control unit for controlling the flow of the gas, a controlling/driving device for controlling the suction capacity of the first pump in sucking the viscous material, a measuring device for measuring the pressure undergone by, and the density of, the viscous material in the discharge device, and a gas phase control unit adapted to transmit commands to the flow control unit and the controlling/driving device so as to control the gas phase which is distributed as bubbles in the interior of the viscous material, the commands being based on values measured by the measuring device.

The first embodiment of the apparatus further includes a curing agent feeder for supplying a curing agent for curing the viscous material and means provided at one end of the discharge device and adapted for mixing the curing agent with the aforesaid mixture when the curing agent has been supplied from the curing agent feeder.

The second embodiment of the apparatus according to the invention comprises a first pump for delivering a viscous material, at least one piston pump for mixing gas in the viscous material in the delivery pipe of the first pump, a second piston pump for applying pressure to a mixture of the gas and the viscous material when the mixture has been delivered from the at least one piston pump, a tubular conduit through which the mixture under pressure is allowed to pass so that the gas may be distributed in the interior of the viscous material, and a discharge device for discharging the mixture when it has passed through the tubular conduit.

The second embodiment of the apparatus further includes, a plurality of piston pumps are allotted for mixing the gas in the viscous material.

The second embodiment of the apparatus according to the invention further includes refers to a pressure regulating valve for regulating the pressure applied to the mixture in the tubular conduit.

The second embodiment of the apparatus further includes a valve provided downstream of the tubular conduit and a pressure control unit for maintaining the pressure applied to the mixture in the tubular conduit, the control action of the pressure control unit being such that the valve is closed when the second piston pump stops applying pressure to the mixture and that the second piston pump is actuated earlier than the opening of the valve.

The second embodiment of the apparatus further includes a flow control unit for controlling the flow of the gas, a controlling/driving device for controlling the supply capability of the at least one piston pump in sucking the viscous material, a measuring device for measuring the pressure undergone by, and the density of, the viscous material in the discharge device, and a gas phase control unit adapted to transmit commands to the flow control unit and the controlling/driving device so as to control the gas phase which is distributed as bubbles in the interior of the viscous material, the commands being based on values measured by the measuring device.

Adhesives, fissure-filling sealants, coating materials, and gaskets to be formed at a job site may be suitable for use as the viscous material. The viscous material may have a hygroscopic setting, thermosetting or reaction-sensitive property. Alternatively, it may be a hot melt coating material. In any case, the desirable property is that, when the viscous material has been discharged and foamed, it quickly cures or solidifies, with the gas phase distributed as bubbles in the interior of the viscous material.

Nitrogen, carbon dioxide and air may be suitable for use as the gas.

A single-shaft screw pump, gear pump, trochoid pump, plunger pump and follower plate pump may be suitable for use as the first pump. Preferably, the piston pump is of the constant flow type.

The length of a pipe used as the tubular conduit for distributing the gas phase as bubbles in the interior of the viscous material ranges from several meters to ten-odd meters. This pipe is kept rectilinear, circular or helical and is supported by frames. As a mixture of the gas and the viscous material is put under pressure while passing through the tubular conduit, the gas is cut into fine bubbles because of shear force. These fine bubbles are distributed in the interior of the viscous material.

Carbon dioxide is liquefied when it is compressed to a pressure of 70 Kg/cm$^2$ or more at 20° C. For this reason, carbon dioxide should be mixed in the viscous material at low pressure and then pressure should be built up so as to liquefy carbon dioxide in the mixture and allow dissolution and dispersion to occur in the viscous material. A substantially higher degree of accuracy can also be achieved in controlling the mixing ratio of the viscous material to the gas.

Carbon dioxide and nitrogen used concomitantly with each other have an advantage that a high expansion ratio is obtained while a uniform distribution of fine bubbles is maintained in the interior of the viscous material. This advantage can be attributed to a difference in pressure required for regasifying the liquefied nitrogen and carbon dioxide. A continuous drop of the pressure in the course of resuming atmospheric pressure provides a condition enabling the regasification of liquefied nitrogen earlier than the regasification of liquefied carbon dioxide. Carbon dioxide, which is regasified later than nitrogen, is apt to be concentrated into cavities formed as uniform cells by antecedently regasified nitrogen.

DETAILED DESCRIPTION OF THE EMBODIMENTS

Figure 1:
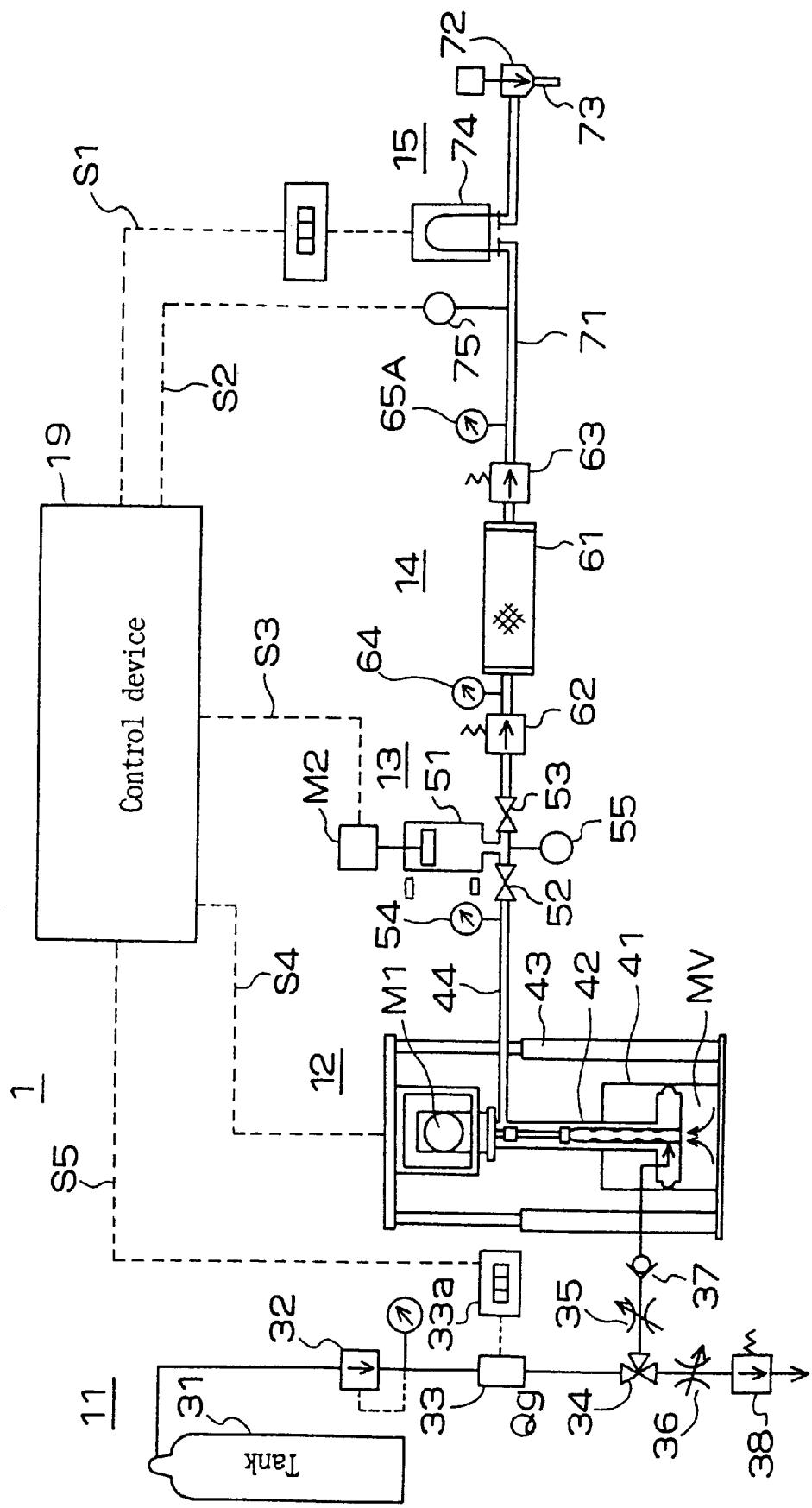
FIG. 1 is a schematic illustration of a circuit utilized in one embodiment of the invention.
Figure 2:
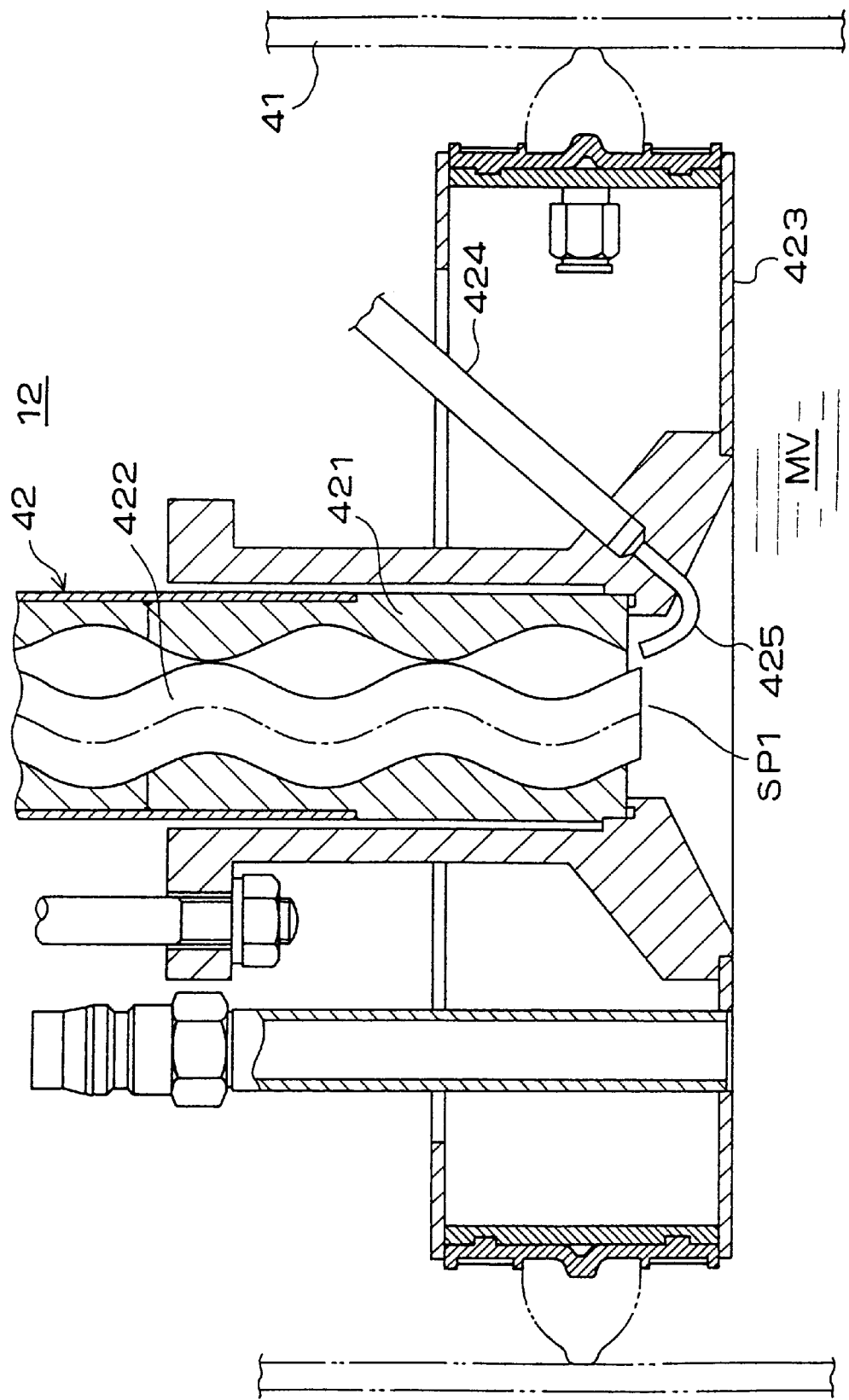
FIG. 2 is a sectional view of the inlet side of a single-shaft screw pump.
Figure 3:
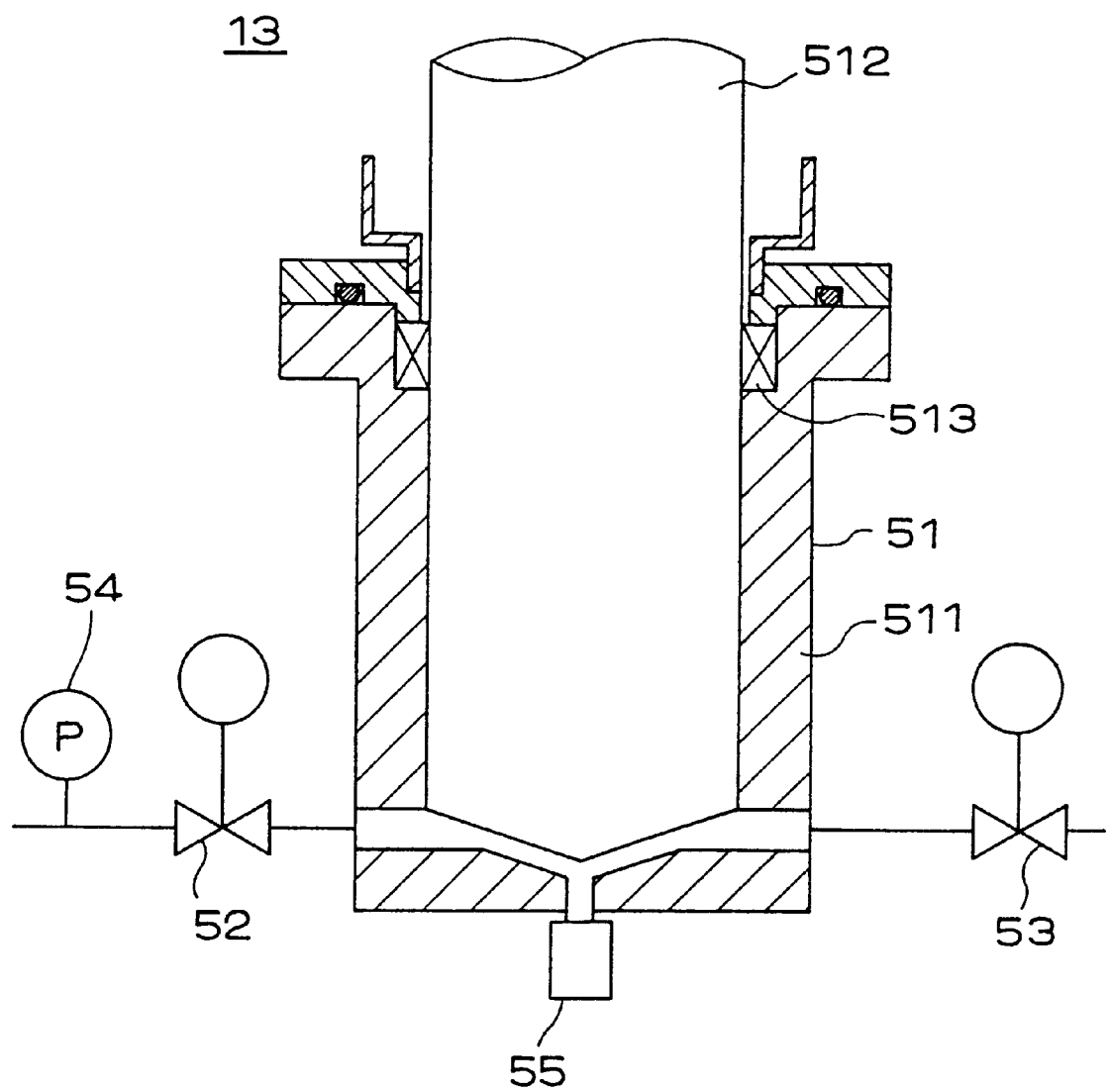
FIG. 3 is a fragmentary sectional elevation of a piston pump.
Figure 4:
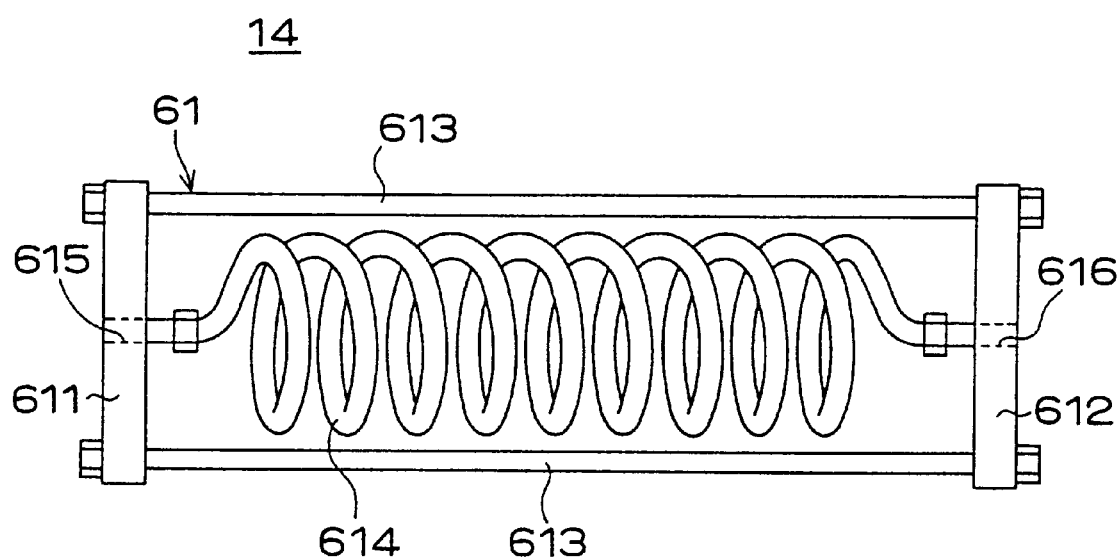
FIG. 4 is a sectional view of a conduit assembly.

FIG. 1 is a schematic illustration of a circuit utilized in an apparatus 1. FIG. 2 is a sectional view of the inlet side of a single-shaft screw pump 42. FIG. 3 is a fragmentary sectional elevation of a piston pump 51. FIG. 4 is a sectional view of a conduit assembly 61.

The apparatus 1 includes a compressed gas feeder 11 and a mixer 12 for the implementation of the aforesaid first step. The apparatus 1 further includes a pressure device 13, distributor 14 and discharge device 15 for the implementation of the aforesaid second, third and fourth steps respectively. All of these components are controlled by a control device 19.

The compressed gas feeder 11 comprises a tank 31, pressure regulating valve 32, flow control unit 33, three-way valve 34, throttle valves 35 and 36, check valve 37 and pressure regulating valve 38.

The tank 31 is filled with high-pressure nitrogen or carbon dioxide. The setting of the pressure regulating valve 32 falls substantially within a range between 1 and 10 Kg/cm$^2$. Because of this valve, the output pressure of the tank 31 is maintained at a predetermined low level. When air is to be used, the tank 31 should be replaced by a compressor. The gas flow rate Qg measured by the flow control unit 33 is displayed on the screen of an indicator 33a. On the other hand, the flow control unit 33 controls the flow of the gas on the basis of a control signal S5 received from the control device 19.

The three-way valve 34 has a first outlet connected to the mixer 12 and a second outlet connected to a pipe opening outwardly. The three-way valve 34 serves to reduce a control error caused in the flow control unit 33 by a difference in the gas flow rate between the case where the gas is supplied to the mixer 12 through the first outlet and the case where the gas is not supplied to the mixer 12 but is vented through the second outlet. Pressure differential in the flow control unit 33 between the case where the mixer 12 is operative and the case where it is inoperative is thereby kept constant. The flow control unit 33 works steadily. The dispersion of the mixing ratio of the viscous material to the gas is confined within a small tolerance.

Low-pressure gas is supplied to the mixer 12 by the compressed gas feeder 11 at a predetermined pressure and gas flow rate.

The mixer 12 comprises a sump 41 containing a viscous material MV, a single-shaft screw pump 42 for use as the aforesaid first pump, a motor M1 for driving the single-shaft screw pump 42, a cylinder assembly 43 supporting the single-shaft screw pump 42 and the motor M1 while Permitting vertical displacement thereof such that the underside of the single-shaft screw pump 42 is adapted to bear upon the viscous material MV, and a tubular conduit 44 connecting the mixer 12 to the pressure device 13. For example, the viscous material MV may have a viscosity of 30,000 cps or more.

As shown in FIG. 2, the single-shaft screw pump 42 comprises a stator 421, rotor 422 and plate 423. One end 425 of a gas pipe 424 for admitting the gas from the compressed gas feeder 11 is disposed at the inlet SP1 of the single-shaft screw pump 42. When the rotor 422 is driven by the motor M1, the viscous material MV is sucked from the inlet SP1. At the same time, the gas is supplied from the end 425 and mixed in the viscous material MV after passage through the inlet SP1. A mixture of the gas and the viscous material MV is moved upwardly in the single-shaft screw pump 42 and delivered to the tubular conduit 44 at a delivery pressure of 100 $Kg/cm^2$ or less which normally falls within a range between 50 and 100 $Kg/cm^2$. Suction pressure in the vicinity of the inlet SP1 is as low as 1 $Kg/cm^2$ or less. Thus, low-pressure gas is introduced into the single-shaft screw pump 42. The rotating speed of the motor MI is controlled by a signal S4 generated by the control device 19. The flow of the mixture through the single-shaft screw pump 42 is controlled thereby.

As shown in FIG. 3, the pressure device 13 comprises a piston pump 51 for use as the aforesaid second pump, a motor M2 for driving the piston pump 51, valves 52 and 53, a pressure gauge 54 and a pressure sensor 55.

The piston pump 51 comprises a cylinder 511, piston 512 and annular seal 513. When the piston 512 is subjected to upward movement with the valve 52 open and the valve 53 closed, the mixture of the gas and the viscous material MV, which has been delivered from the mixer 12, is sucked into the cylinder 511. When the piston 512 is lowered with the valve 52 closed and the valve 53 open, the mixture is forced out of the cylinder 511 at an extrusion pressure of 150 $Kg/cm^2$ or more. The internal pressure of the cylinder 511 is detected by the pressure sensor 55 and outputted to the control device 19. The pressure gauge 54 outputs a signal when it detects a preset pressure. The flow of the mixture through the piston pump 51, as well as the inlet velocity and the extrusion rate of the piston pump 51, is controlled by the rotating speed of the motor M2, which in turn is controlled by a signal S3 generated by the control device 19.

Referring again to FIG. 1, the distributor 14 comprises a conduit assembly 61, pressure regulating valves 62 and 63, and pressure gauges 64 and 65A.

As shown in FIG. 4, the conduit assembly 61 comprises a pair of plates 611 and 612 disposed in spaced parallel relation with each other and interconnected by a plurality of rods 613. Ports 615 and 616, which receive the journal portions of a helical pipe 614, are provided in the plates 611 and 612 respectively. The helical pipe 614 corresponds to the aforesaid tubular conduit through which the mixture under pressure is allowed to pass so that the gas may be distributed in the interior of the viscous material. The conduit assembly 61 may consist solely of a helical pipe.

The helical pipe 614 may be a steel pipe having an overall length of 5 to 10 meters in case of a nominal bore of ⅜ inch and having an overall length of 2 to 10 meters in case of a nominal bore of ¼ inch. For example, fine bubbles having a mean diameter of about 0.01 mm will be distributed in the interior of the viscous material MV if the mixture is forced out of the cylinder 511 at an extrusion pressure of 150 $Kg/cm^2$ or more, preferably at 200 to 250 $Kg/cm^2$, and allowed to pass through the conduit assembly 61 at the rate of 200 cc/min.

An explanation for the distribution of fine bubbles in the interior of the viscous material MV may be provided as follows: During the passage of the gas through the helical pipe 614, large bubbles move toward the pipe wall where the flow velocity is low. This is because the viscosity of gas is much lower and the specific gravity thereof is much smaller than those of the viscous material MV. Shear force developed between the pipe wall and the viscous material MV serves to tear the large bubbles to fine bubbles and distribute them in the interior of the viscous material MV. Each of the fine bubbles contracts as it is put under high pressure. The result is that it becomes ultrafine to such an extent that it provides only a small difference from the viscous material MV in the viscosity and specific gravity. Consequently, the ultrafine bubbles return from the pipe wall to the inner portion of the pipe. The bubbles expand when the internal pressure of the pipe drops. They move again toward the pipe wall, where they undergo shear force again. As this course of events is repeated, the gas is torn and distributed in the interior of the viscous material MV.

There is another conjecture to offer on the cause of distribution of fine bubbles in the interior of the viscous material MV. When the mixture under pressure is allowed to pass through the tubular conduit, a pressure gradient occurs due to a pressure loss in the tubular conduit. In the low-pressure area, lumps of gas expand, collapse and break up. Continuous occurrence of expansion, collapse and breakup to which the lumps of gas mixed in the viscous material is subjected in the tubular conduit allows fine bubbles to be distributed in the interior of the viscous material. Foamed material is obtained when the mixture of the gas and the viscous material is discharged into the air.

The internal pressure, bore and pipe length of the helical pipe 614 should be determined on the basis of the viscosity and the specific gravity of the viscous material MV and the desired discharge rate.

Pressure applied to the viscous material MV in the conduit assembly 61 is maintained at a high level by means of the pressure regulating valves 62 and 63. The setting of the valve 62 falls substantially within a range between 150 and 350 $Kg/cm^2$, while the setting of the valve 63 falls substantially within a range between 50 and 250 $Kg/cm^2$.

Referring again to FIG. 1, the mixture of the gas and the viscous material MV is delivered from the distributor 14 to the discharge device 15. When the mixture is discharged from the discharge device 15, the pressure which has been applied to the mixture is dropped to atmospheric pressure so as to effect foaming. The discharge device 15 comprises a discharge pipe 71, discharge valve 72, nozzle 73, densitometer 74 and pressure sensor 75.

The mixture delivered from the distributor 14 undergoes a gradual pressure drop to atmospheric pressure during passage through the discharge pipe 71. The pressure drop allows the gas to expand. When the discharge valve 72 is open, the mixture is discharged through the nozzle 73. The discharge of the mixture will inevitably cause a further drop of the pressure, which will result in foaming. In order to apply the foamed viscous material MV to an object, the nozzle 73 is allowed to follow in a predetermined path of travel.

The densitometer 74 is an on-line instrument for continuously measuring, e.g., the mass of the viscous material MV during passage therethrough. Signals S1 and S2 developed respectively by the densitometer 74 and the pressure sensor 75 are fed to the control device 19.

The control device 19 calculates an expansion ratio A on the basis of the signals S1 and S2 and develops signals S3 to S5 for controlling the gas flow rate Qg and the suction capacity of the single-shaft screw pump 42 so as to allow the expansion ratio A to assume a prescribed value. The whole of the apparatus 1 is controlled by the control device 19 such that a series of processes for discharging the viscous material MV are subjected to on-line control so as to allow the expansion ratio A to assume a prescribed value. The expansion ratio A is given by $$A = V_1/V_0$$

where $V_1$=volume per unit mass of viscous material after foaming (i.e. after discharge into the air)

$V_0$=volume per unit mass of viscous material before foaming

An expansion ratio A of about 0.1 to 4 can be set in the apparatus 1. The set value normally falls within a range between 2 and 4 when the viscous material is intended for use as a gasket to be formed at a job site.

In the apparatus 1, the inlet SP1 of the single-shaft screw pump 42 gets a supply of the gas from the tank 31 at pressures which are substantially as low as atmospheric pressure. Consequently, the mixing ratio of the viscous material MV to the gas can be controlled with high accuracy by controlling the gas flow rate Qg. This means that the expansion ratio A of the viscous material MV can be accurately controlled so as to uniformly foam the material. Since gas pressure is low, the tank 31 need not be a high-pressure storage tank. It is even possible to allow a compressor to supply low-pressure compressed air.

As aforesaid, the mixture under pressure is allowed to pass through the conduit assembly 61. With such an arrangement it is possible to tear the large bubbles to fine bubbles and improve the efficiency in distributing them in the interior of the viscous material. The conduit assembly 61 is simple enough in construction to facilitate maintenance work and make the apparatus relatively inexpensive in cost. The conduit assembly 61 can be used concomitantly with an ordinary mixer such as a power mixer or a static mixer in the aforesaid second, third or fourth step.

The apparatus 1 may take various forms.

Figure 5:
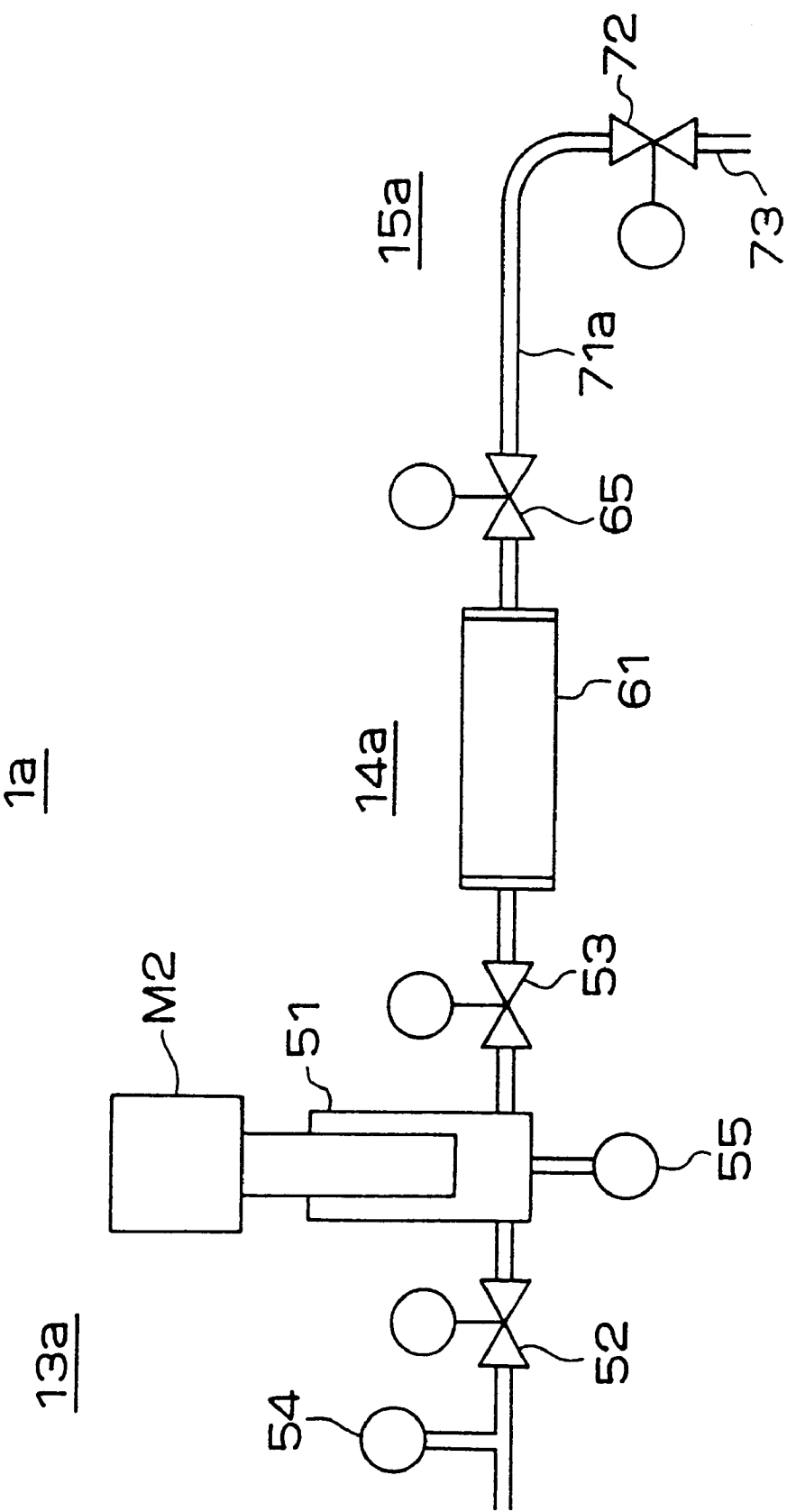
FIG. 5 is a schematic illustration of a portion of a circuit utilized in another embodiment of the invention.
Figure 6:
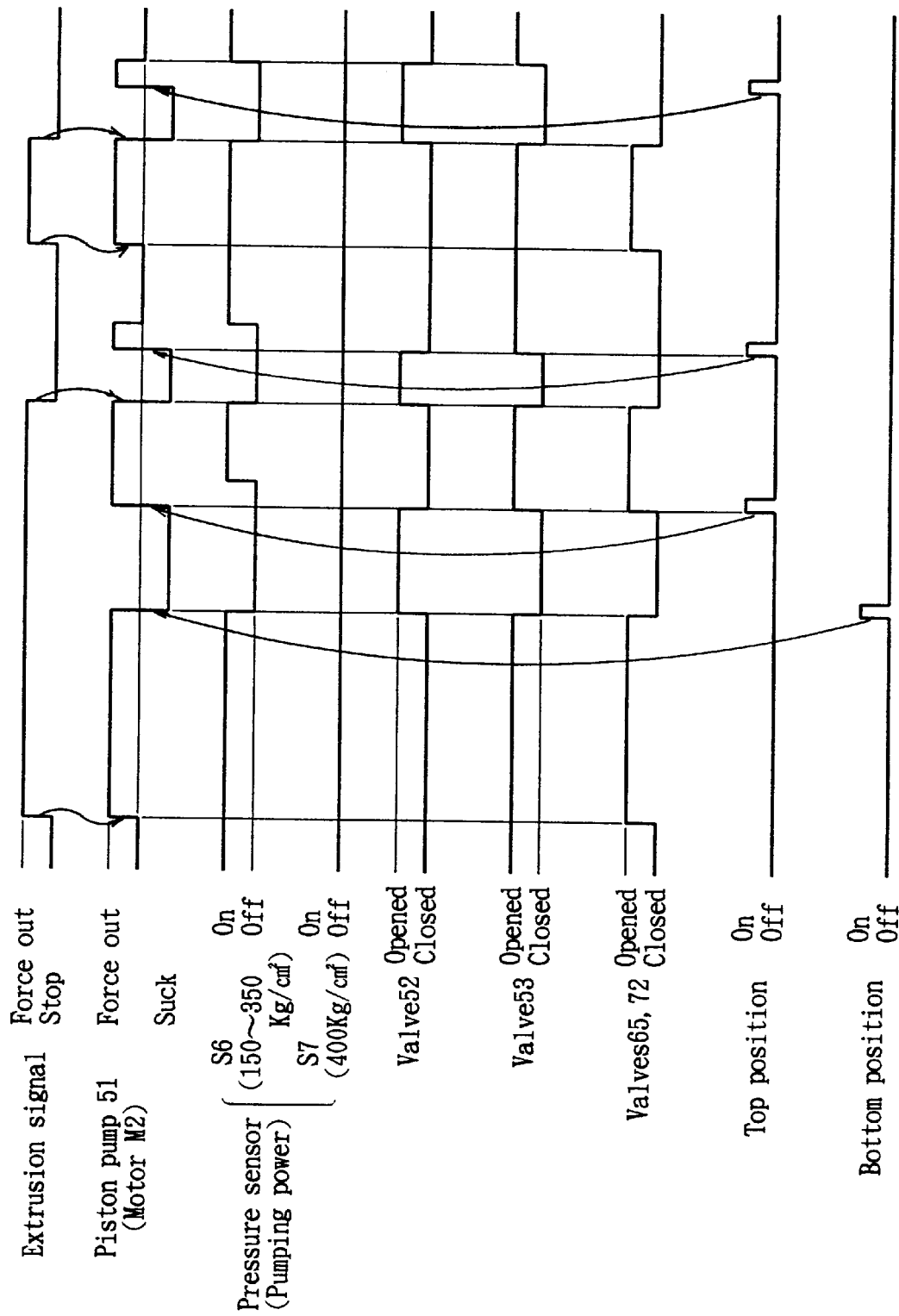
FIG. 6 is a time sequence diagram useful in understanding the operation of the apparatus shown in FIG. 5.

FIG. 5 shows a pressure device 13$a$, distributor 14$a$ and discharge device 15$a$ utilized in another embodiment 1$a$ of the invention. FIG. 6 is a time sequence diagram useful in understanding the operation of the apparatus 1$a$. In FIG. 5 and those that follow, like characters designate corresponding parts shown in FIG. 1.

In the apparatus 1$a$, the aforesaid pressure regulating valve 63 is replaced by a valve 65, which is installed in the discharge pipe 71$a$ provided downstream of the conduit assembly 61. In the aforesaid apparatus 1, pressure applied to the viscous material in the conduit assembly 61 is maintained at a predetermined level by means of the pressure regulating valve 63. The apparatus 1$a$ differs from the apparatus 1 by the fact that the same object as mentioned above is accomplished by allowing the discharge pipe 71$a$ to have a smaller bore and hence a larger line resistance and by suitably controlling the valve timing of the valve 65.

As shown in FIGS. 5 and 6, the extrusion pressure of the piston pump 51 is detected by the pressure sensor 55, which develops a signal S6 when the detected pressure is greater than or equal to a set value (150 to 350 Kg/cm$^2$) and an alarm signal S7 when the detected pressure is greater than or equal to 400 Kg/cm$^2$, which is a maximum allowable value for the apparatus. An extrusion signal causes the viscous material MV to be forced out of the piston pump 51. During the time when the extrusion signal is developed and the viscous material MV is made ready for being discharged, the valves 65 and 72 are opened to discharge and foam the viscous material MV. During the extrusion of the viscous material MV, pressure developed by the line resistance of the discharge pipe 71$a$ gives rise to internal pressure at a predetermined high level in the interior of the conduit assembly 61. Even if the extrusion signal is still developed, the valves 65 and 72 are closed and a switchover to the suction stroke is automatically made when a proximity sensor mounted on the piston pump 51 develops a signal indicating that the piston of the piston pump 51 has reached the bottom position of its extrusion stroke. A signal S7 developed by the pressure sensor 55 is regarded as the indication that an abnormal condition such as the choking-up of the pipeline has occurred. In this case, the apparatus is stopped and an alarm is given.

When the extrusion signal stops being developed, the valves 53, 65 and 72 are closed and the valve 52 is opened. Then the suction stroke of the piston pump 51 is effected. Then, while the valves 65 and 72 are kept closed, the valve 53 is opened and the valve 52 is closed. Then the extrusion stroke of the piston pump 51 is effected just for a little while. Thereby the viscous material MV is forced out of the piston pump 51 and the signal S6 is developed by the pressure sensor 55. The states of the valves 52, 53, 65 and 72 are left unchanged and the piston pump 51 is stopped and allowed to stand by, with the internal pressure of the conduit assembly 61 maintained at a predetermined level so as to prevent it from being dropped at the subsequent time when the discharge signal is developed and the extrusion stroke of the piston pump 51 is effected. Consequently, the distribution of the gas phase in the interior of the viscous material is properly effected in the conduit assembly 61.

The apparatus 1$a$ is relatively inexpensive in cost in so far as the pressure regulating valve 63 is unnecessary.

Figure 7:
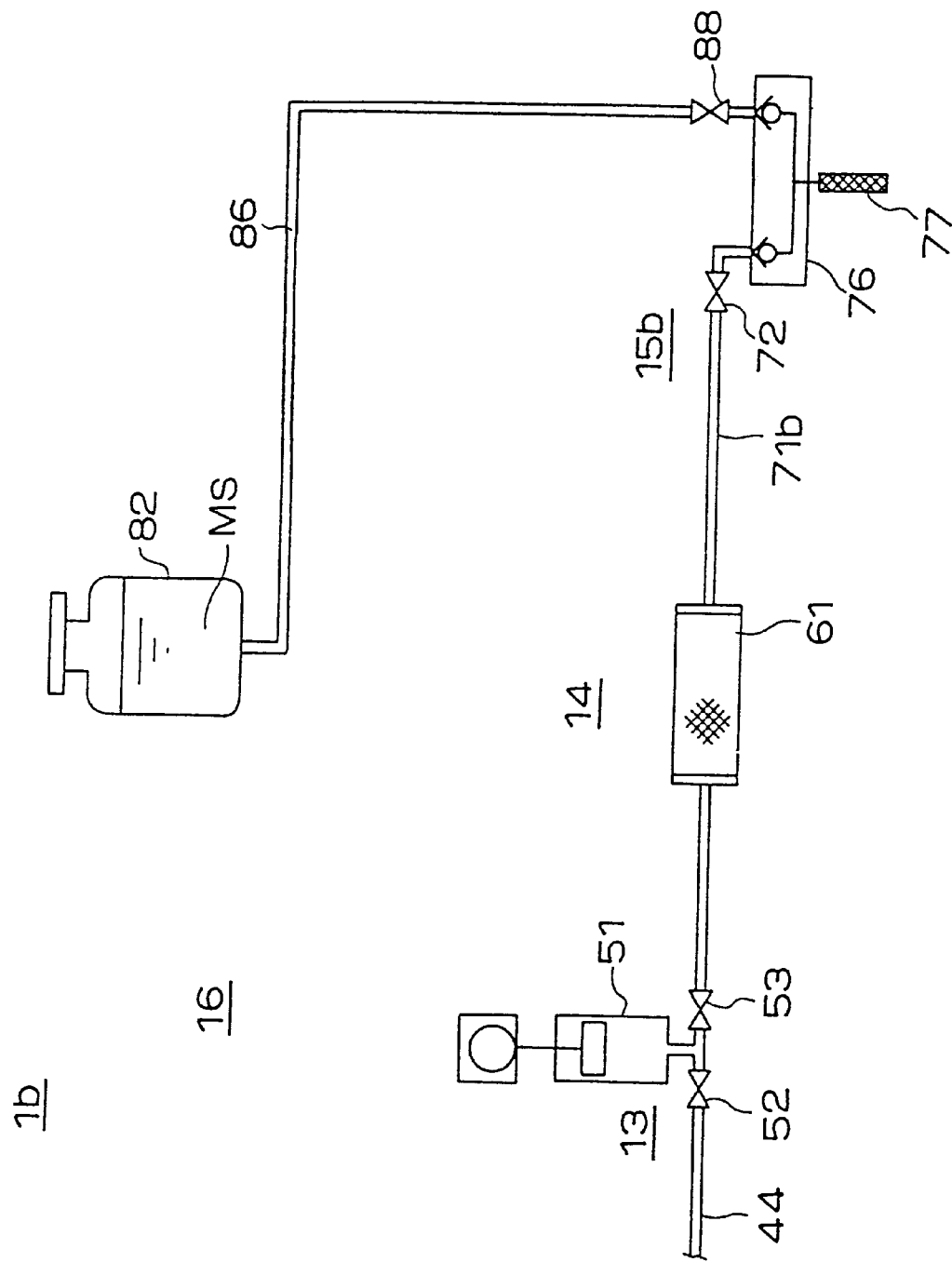
FIG. 7 is a schematic illustration of a portion of a circuit utilized in still another embodiment of the invention.

Still another embodiment 1$b$ of the invention illustrated in FIG. 7 includes a curing agent feeder 16 which permits double-fluid curing type viscous materials to be used. A curing agent MS is introduced into, and mixed with, the viscous material MV in a manifold 76 provided at the downstream end of the discharge Pipe 71$b$. A check valve is incorporated in the manifold 76, in which the curing agent MS is mixed to a sufficient degree with the viscous material MV by means of a power mixer or a static mixer 77. Then the mixture is discharged.

The curing agent feeder 16 comprises a supply pipe 86, a flowmeter, valves 88 and 89.

The curing agent MS is contained in a curing agent tank 82, from which the supply pipe 86 leads to the manifold 76 so as to allow the curing agent MS to join the viscous material MV. Much latitude is allowed in the selection of the mixing ratio of the curing agent MS to the viscous material MV, because the flows of the viscous material MV and the curing agent MS are determined by the working conditions of the piston pump 51 and a curing agent pump 83 respectively.

The cure rate can be quickened by the apparatus 1b, because double-fluid curing type viscous materials can be used. Only a few components need to be washed, because the curing agent MS is allowed to join the viscous material MV at the downstream end of the discharge pipe 71b.

Reference will now be had to the case where carbon dioxide is used as the gas to be mixed in the viscous material.

Carbon dioxide is in a gasified state at low pressures and is easily liquefied at high pressures (e.g. at 70 Kg/cm$^2$ at 20°). Because of this property, it is easy to control the flow of the gas when the gas is to be mixed in the viscous material. A high degree of accuracy can be achieved in controlling the mixing ratio of the viscous material to the gas. A uniform distribution of fine bubbles can also be achieved in the interior of the viscous material.

Referring again to the apparatus 1 shown in FIG. 1, the tank 31 incorporated in the compressed gas feeder 11 is filled with high-pressure carbon dioxide. The setting of the pressure regulating valve 32 is less than 10 Kg/cm$^2$, preferably about 7 Kg/cm$^2$ by way of example. Because of this valve, the output pressure of the tank 31 is maintained at a predetermined low level.

Low-pressure carbon dioxide is supplied to the mixer 12 by the compressed gas feeder 11 at a predetermined pressure and gas flow rate.

A mixture of carbon dioxide and the viscous material MV is prepared by the mixer 12, delivered to the tubular conduit 44 at a delivery pressure of, e.g., about 50 Kg/cm$^2$, and supplied to the pressure device 13.

Pressure applied to the mixture is built up in the pressure device 13 so as to liquefy carbon dioxide and dissolve the liquefied carbon dioxide in the viscous material MV for ease of dispersion therein.

The mixture is forced out of the piston pump 51 of the pressure device 13 at an extrusion pressure of 100 Kg/cm$^2$ or more, preferably at 150 to 300 Kg/cm$^2$. The extrusion pressure is adjusted by, e.g., the pressure regulating valve 62.

The mixture of carbon dioxide and the viscous material MV is delivered from the pressure device 13 to the discharge device 15. When the mixture is discharged from the discharge device 15, the pressure which has been applied to the mixture is dropped to atmospheric pressure so as to regasify the liquefied carbon dioxide and effect foaming.

Carbon dioxide is easily liquefied at high pressures, while nitrogen is still in a gasified state at high pressures under which carbon dioxide is already liquefied. Therefore, when carbon dioxide and nitrogen are used concomitantly with each other as the gases to be mixed in the viscous material, carbon dioxide is regasified later than nitrogen and is concentrated into cells antecedently formed by gaseous nitrogen and distributed in the interior of the viscous material. Consequently, the cells are inflated and a high expansion ratio is obtained.

Figure 8:
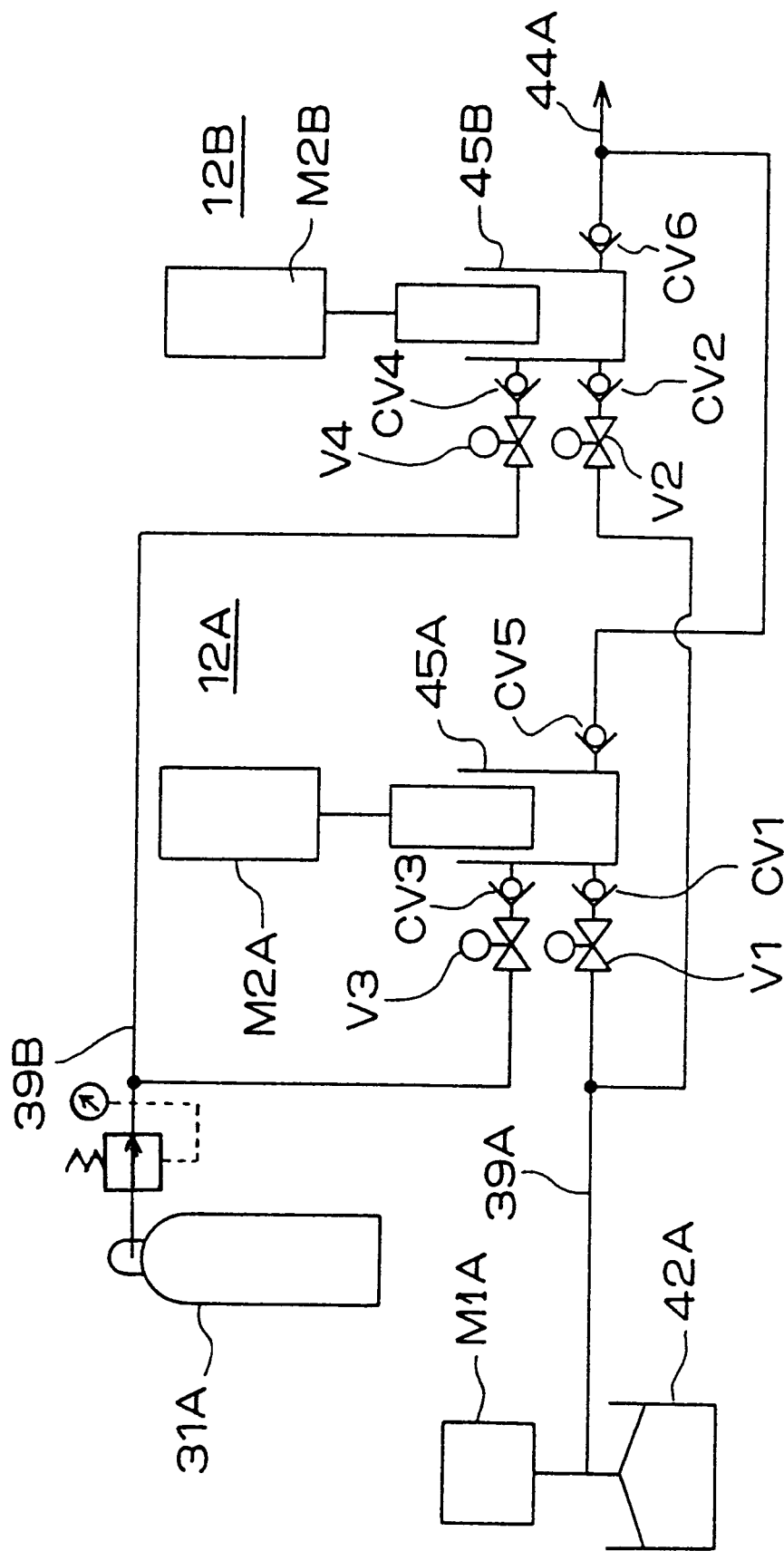
FIG. 8 is a schematic illustration of a portion of a circuit utilized in yet still another embodiment of the invention.

Yet still another embodiment 1c of the invention is illustrated in FIG. 8. The pressure device 13 and the distributor 14 for the implementation of the aforesaid second and third steps respectively in the apparatus 1 shown in FIG. 1 are omitted from the apparatus 1c shown in FIG. 8 for the sake of simplicity.

In the apparatus 1c shown in FIG. 8, a follower plate pump 42A ordinarily used for subjecting viscous materials to pressure feed is used as the aforesaid first pump for delivering the viscous material, and two piston pumps 45A and 45B are used as the aforesaid at least one piston pump. By means of these two piston pumps, gas is mixed in the viscous material delivered from the follower plate pump 42A.

By means of a plate, the follower plate pump 42A exerts pressure upon the viscous material contained in a sump. Thereby the viscous material is delivered to a tubular conduit 39A. The piston pumps 45A and 45B are interposed between the tubular conduits 39A and 44A. Gas is supplied from the tank 31A and mixed in the viscous material delivered from the follower plate pump 42A.

The cylinder capacities of the piston pumps 45A and 45B are determined by the stroke lengths of the pistons. To begin with, gas is supplied from the tank 31A to each cylinder at a pressure of 10 Kg/cm$^2$ or less up to a prescribed amount corresponding to the cylinder capacity during the suction stroke of the piston pumps 45A and 45B. Then the viscous material is supplied at a prescribed pressure of 10 Kg/cm$^2$ or more from the follower plate pump 42A to each cylinder filled with the gas. In this case, the ratio of gas pressure to the pressure undergone by the viscous material corresponds to the mixing ratio of the gas to the viscous material. Therefore, the mixing ratio can be easily controlled.

Pressure undergone by the viscous material to be supplied to the piston pumps 45A and 45B is adjusted by means of a control valve (such as a piston valve) installed in the tubular conduit 39A under the condition that the follower plate pump 42A is in course of subjecting the viscous material to pressure feed.

Pressure undergone by the gas to be supplied to the piston pumps 45A and 45B is adjusted by means of a pressure regulating valve or valves installed in gas piping 39B. In this embodiment, the gas is supplied to the piston pumps 45A and 45B at a prescribed pressure which is lower than 10 Kg/cm$^2$, although the gas can be supplied at atmospheric pressure to the piston pumps 45A and 45B.

The discharge stroke begins when the gas and the viscous material have been sucked by the piston pumps 45A and 45B. In the discharge stroke, the mixture of the gas and the viscous material is delivered to the piston pump 51 used as the aforesaid second piston pump through a flow regulating valve such as a piston valve or a check valve installed in the tubular conduit 44A provided at the discharge side of the piston pump 45B. If the cylinder capacities of the piston pumps 45A and 45B are made small in so far as possible, the amount of the mixture delivered by a single discharge stroke will be minimized and thereby the flow of the mixture will be made discontinuous. Consequently, the distribution of the gas phase in the interior of the viscous material will be properly effected in the subsequent distribution step.

The mixture is delivered from the piston pump 51 to the helical pipe 614 allotted for distributing the gas in the interior of the viscous material. During passage through the helical pipe 614, the gas is distributed, dissolved and mixed in the viscous material.

As compared with the case where a single piston pump is used as the aforesaid at least one piston pump, the gross discharge rate which can be achieved by two piston pumps 45A and 45B shown in FIG. 8 is higher as a matter of course. Discharge at a constant discharge rate can also be continuously effected. More than two piston pumps may be used. A plurality of piston pumps may be operated alternately or at staggered operating time. In order to permit continuous discharge to be effected by two piston pumps, the suction stroke may be effected at higher speed than the discharge stroke.

The piston pumps 45A and 45B may be operated alternately. Alternatively, one piston pump may be operated independently, with the operation of the other being suspended. The user of the apparatus 1c shown in FIG. 8 can choose between these two modes of operation and make a switchover from one mode of operation to the other.

Figure 9:
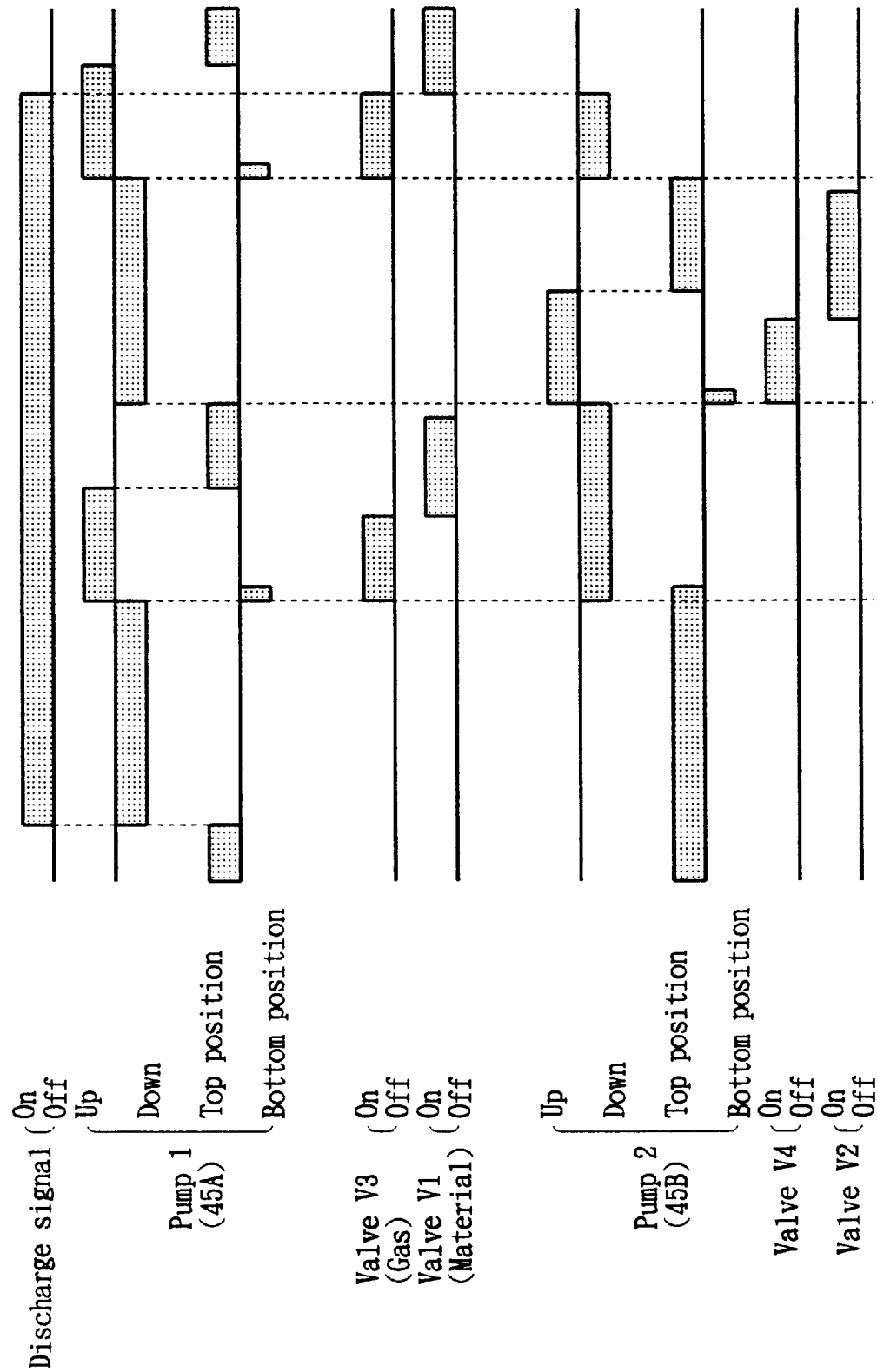
FIG. 9 is a time sequence diagram useful in understanding the operation of the apparatus shown in FIG. 8, wherein two piston pumps are alternately operated.
Figure 10:
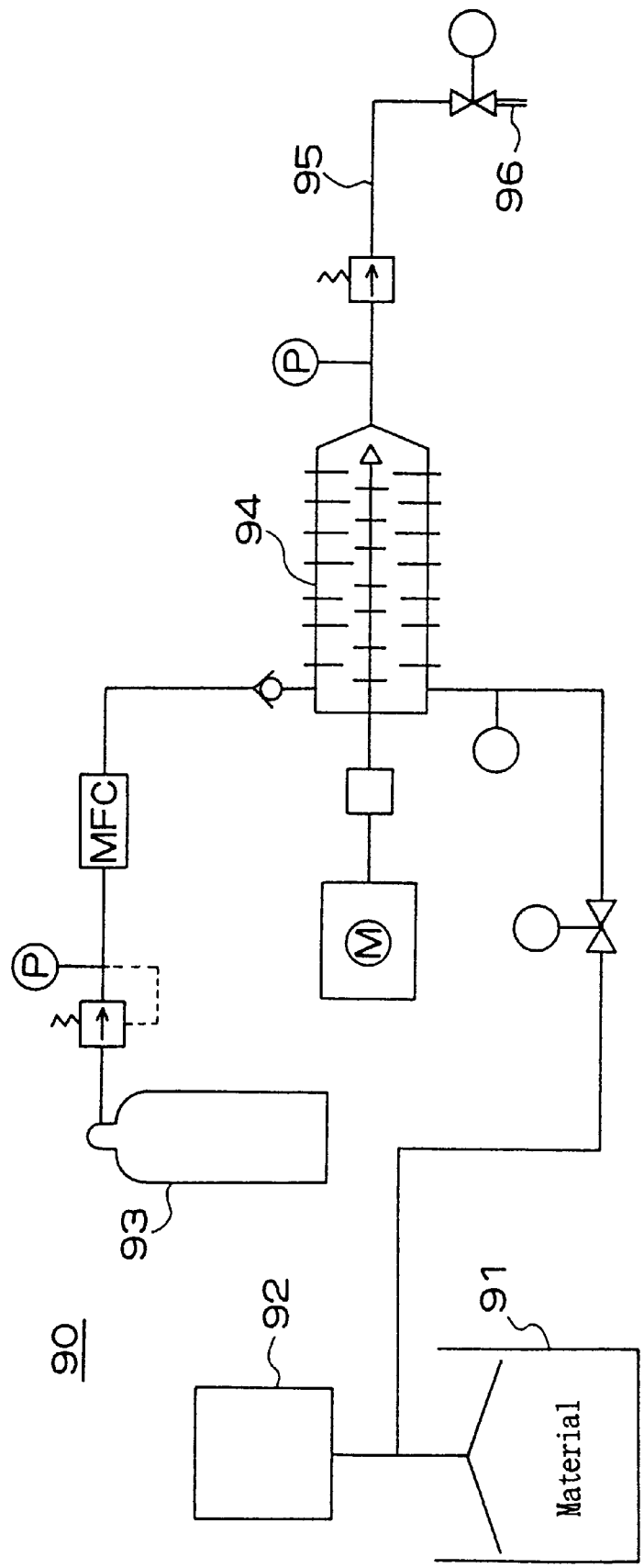
FIG. 10 shows a schematic view of a circuit that constitutes a prior art apparatus.

FIG. 9 is a time sequence diagram useful in understanding the operation of the apparatus shown in FIG. 8, wherein two piston pumps 45A and 45B are alternately operated.

Referring now to FIG. 9, the control over the piston pumps 45A and 45B is timed to a suction signal transmitted to the piston pump 51 used as the aforesaid second piston pump. In FIG. 9, the piston pumps 45A and 45B are referred to as a "pump 1" and a "pump 2" respectively.

During the downward movement of the piston in the first discharge stroke of the piston pump 45A, the piston of the piston pump 45B stands by in the top position with the gas and the viscous material sucked. When the piston of the piston pump 45A has reached the bottom position of its discharge stroke, the piston of the piston pump 45B begins to move downwardly for the implementation of the discharge stroke.

During the discharge stroke of the piston pump 45B, the piston pump 45A sucks the gas and the viscous material and stands by for the subsequent discharge stroke.

Control valves for supplying the piston pumps 45A and 45B with the gas and the viscous material are opened and closed in accordance with time pre-set in timers. For example, during the upward movement of the piston in the suction stroke of the piston pump 45A, a control valve V3 for supplying the piston pump 45A with the gas is open for the length of pre-set time. During this pre-set time, the piston pump 45A is supplied with the gas. When the time is up, the control valve V3 is closed and a control valve VI is opened for supplying the piston pump 45A with the viscous material.

During the upward movement of the piston in the suction stroke of the piston pump 45B, a control valve V4 for supplying the piston pump 45B with the gas is open. When the piston pump 45B has been supplied with the gas, a control valve V2 is opened for supplying the piston pump 45B with the viscous material. The length of time to be pre-set in the timers is determined by parameters such as the viscosity of the viscous material.

Thus the discharge stroke of the piston pump 45B begins when the discharge stroke of the piston pump 45A has ended. In this manner, the discharge stroke of one piston pump alternating with that of the other permits the continuous discharge of the mixture to be effected by two piston pumps used as the aforesaid at least one piston pump.

In the apparatuses 1, 1a, 1b and 1c, the single-shaft screw pump 42 may be replaced by a gear pump, trochoid pump, etc., and the piston pump 51 may be replaced by a gear pump, plunger pump, etc. The conduit assembly 61 may be used concomitantly with a power mixer or a static mixer. Should it be at any time desired to make changes in the construction, shape, dimension, material, number and operational time sequence of any of these apparatuses or of the distributor 14, changes may be made therein without departing from the nature and principle of the invention.

Having now described the instant inventive concept in more general terms, the following specific examples, in which the apparatus 1c was used, will serve to illustrate the same:

EXAMPLE 1

A polyurethane sealant having a hygroscopic setting property and a viscosity of 200,000 cps, e.g. RD-4161 sold by Sunstar Engineering Inc., was used as the viscous material MV. Carbon dioxide and nitrogen were used as the gases to be mixed in the viscous material MV. Various values of the gas flow rate Qg were used. The results of the experiment are given in Table 1.

TABLE 1

| Example | Kind of gas | Gas supply pressure ($Kg/cm^2$) | Gas flow rate (NL/min) | Pressure applied to mixture ($Kg/cm^2$) | Expansion ratio | Distribution of cells |
|---|---|---|---|---|---|---|
| 1 | $CO_2$ | 7.0 | 0.20 | 200 | 2.20 | Very uniform |
| 2 | $CO_2$ | 7.0 | 0.40 | 190 | 3.80 | Very uniform |
| 3 | $CO_2$ | 7.0 | 0.60 | 185 | 5.60 | Very uniform |
| 4 | $N_2$ | 7.0 | 0.20 | 190 | 2.20 | Very uniform |
| 5 | $N_2$ | 7.0 | 0.40 | 180 | 2.80 | Very uniform |

Table 1 indicates that a high expansion ratio and very uniform distribution of cells are obtained from carbon dioxide used as a gas to be mixed in the viscous material.

Likewise, a high expansion ratio A was obtained from an experiment conducted under similar conditions wherein carbon dioxide and nitrogen were supplied at low pressure. Since carbon dioxide is easily liquefied at high pressure, the mixture of the gases and the viscous material MV could have a high degree of accuracy of mixing ratio.

EXAMPLE 2

A procedure similar to Example 1 was utilized except that a polyurethane sealant having a thermosetting property (sold by Sunstar Engineering Inc.) was used as the viscous material MV. Carbon dioxide and nitrogen were used as the gases to be mixed in the viscous material MV. Carbon dioxide was supplied at a supply pressure of 7 $Kg/cm^2$. Gases were supplied at a flow rate Qg of 0.22 NL/min. A pressure of 280 $Kg/cm^2$ was applied to the mixture. In an experiment conducted under similar conditions, the polyurethane sealant having a thermosetting property was replaced by a polyurethane sealant having a hygroscopic setting/cold setting property. The results of the first mentioned experiment are given in Table 2.

TABLE 2

| Example | Kind of material | Curing condition | Expansion ratio immediately after coating | Expansion ratio after coating |
|---|---|---|---|---|
| 6 | Thermosetting polyurethane | 80° C. × 10 min | 5.40 | 5.20 |

TABLE 2-continued

| Example | Kind of material | Curing condition | Expansion ratio immediately after coating | Expansion ratio after coating |
|---|---|---|---|---|
| 7 | Hygroscopic setting polyurethane | 20° C. × 16 hrs | 5.60 | 3.30 |

Table 2 indicates that the expansion ratio A is stabilized by a thermosetting viscous material MV which rapidly cures at relatively low temperatures.

Ordinarily during a curing process, gas leakage causes a marked decline in the expansion ratio A of a foamed material having a high expansion ratio A. A high cure rate answers the gas retaining purpose and allows a foamed material having a high expansion ratio A to be obtained.

In brief, the invention resides in mixing low-pressure gas in a viscous material by means of an apparatus which is simple in construction. The flow of the gas can be easily controlled so that the dispersion of the mixing ratio of the viscous material to the gas may be confined within a small tolerance and fine bubbles may be uniformly distributed in the interior of the viscous material. Although it is most common to use a power mixer or a gear pump for the aforesaid mixing purpose, the invention obviates the necessity therefor and thereby makes the apparatus relatively inexpensive in cost. The foamed material is free from an adverse effect which has been caused by heat produced by friction during a manufacturing process.

The apparatus of the present invention permits the aforesaid mixing ratio to be easily controlled and a suitable expansion ratio to be obtained.

The apparatus of the present invention the pressure applied to the mixture in the tubular conduit to be maintained at a high level so as to stabilize the distribution of the gas phase in the interior of the viscous material.

The apparatus of the present invention is simple in construction and yet capable of uniformly distributing the gas phase in the interior of the viscous material and stabilizing the foaming thereof.

The curing agent feeder of the present invention permits double-fluid curing type viscous materials to be used for obtaining a high cure rate.

What is claimed is:

1. An apparatus for foaming a viscous material comprising:
   a first pump for delivering a viscous material;
   at least one first piston pump for mixing gas in said viscous material in the delivery pipe of said first pump;
   control valves respectively provided at inlets of said gas and viscous material of said at least one first piston pump;
   a second piston pump for applying pressure to a mixture of said gas and said viscous material when said mixture has been delivered from said at least one first piston pump;
   a tubular conduit through which said mixture under pressure passes so that said gas is distributed in the interior of said viscous material; and
   a discharge device for discharging said mixture passing through said tubular conduit.

2. The apparatus as defined in claim 1, wherein there are a plurality of first piston pumps for mixing said gas in said viscous material.

3. The apparatus as defined in claim 1, further including a pressure regulating valve for regulating the pressure applied to said mixture in said tubular conduit.

4. The apparatus as defined claim 1, further including:
   a valve provided downstream of said tubular conduit; and
   a pressure control unit for maintaining the pressure applied to said mixture in said tubular conduit, said pressure control unit closes said valve when said second pump stops applying pressure to said mixture and actuates said second pump before opening said valve.

5. The apparatus as defined claim 1, further including:
   a flow control unit for controlling the flow of said gas;
   a controlling/driving device for controlling the supply capability of said at least one first piston pump in sucking said viscous material;
   a measuring device for measuring the pressure undergone by, and the density of, said viscous material in said discharge device; and
   a gas phase control unit adapted to transmit commands to said flow control unit and said controlling/driving device so as to control the gas phase which is distributed as bubbles in the interior of said viscous material, said commands being based on values measured by said measuring device.

6. An apparatus for foaming a viscous material comprising:
   a first pump for delivering a viscous material;
   at least one first piston pump for mixing gas in said viscous material;
   first control means for supplying said at least one first piston pump with said gas;
   second control means for supplying said at least one first piston pump containing said gas with said viscous material;
   a second piston pump for applying pressure to a mixture of said gas and said viscous material when said mixture has been delivered from said at least one first piston pump;
   a tubular conduit through which said mixture under pressure passes so that said gas is distributed in the interior of said viscous material; and
   a discharge device for discharging said mixture passing through said tubular conduit.

* * * * *